(12) United States Patent
Grattan

(10) Patent No.: US 10,118,644 B2
(45) Date of Patent: Nov. 6, 2018

(54) VEHICLE BODY STRUCTURE

(71) Applicant: Nissan North America, Inc., Franklin, TN (US)

(72) Inventor: Patrick Grattan, Wixom, MI (US)

(73) Assignee: Nissan North America, Inc., Franklin, TN (US)

(*) Notice: Subject to any disclaimer, the term of this patent is extended or adjusted under 35 U.S.C. 154(b) by 57 days.

(21) Appl. No.: 15/404,365

(22) Filed: Jan. 12, 2017

(65) Prior Publication Data

US 2018/0194401 A1 Jul. 12, 2018

(51) Int. Cl.
| | |
|---|---|
| *B60N 99/00* | (2006.01) |
| *B62D 21/15* | (2006.01) |
| *B62D 29/00* | (2006.01) |
| *B62D 27/02* | (2006.01) |
| *B62D 27/06* | (2006.01) |
| *B62D 21/07* | (2006.01) |

(52) U.S. Cl.
CPC ............ *B62D 21/152* (2013.01); *B62D 21/07* (2013.01); *B62D 27/023* (2013.01); *B62D 27/065* (2013.01); *B62D 29/007* (2013.01)

(58) Field of Classification Search
CPC .... B62D 21/152; B62D 21/07; B62D 27/023; B62D 27/065; B62D 29/007
See application file for complete search history.

(56) References Cited

U.S. PATENT DOCUMENTS

| | | | |
|---|---|---|---|
| 7,819,218 B2 | 10/2010 | Eichberger et al. | |
| 8,398,153 B1 | 3/2013 | Dandekar et al. | |
| 8,764,096 B2 | 7/2014 | Han et al. | |
| 8,985,258 B1 | 3/2015 | Midoun et al. | |
| 8,985,671 B1 | 3/2015 | Lei et al. | |
| 9,056,634 B2 | 6/2015 | Watanabe | |
| 9,061,713 B2* | 6/2015 | Hashimoto | B62D 21/152 |
| 9,067,549 B2 | 6/2015 | Baccouche et al. | |
| 9,079,619 B2 | 7/2015 | Gupta et al. | |
| 9,193,318 B2 | 11/2015 | Barbat et al. | |
| 9,211,915 B2* | 12/2015 | Abe | B62D 21/152 |
| 9,233,716 B2 | 1/2016 | Midoun et al. | |
| 9,266,485 B2 | 2/2016 | Kuriyama et al. | |
| 9,272,678 B2 | 3/2016 | Nam et al. | |
| 9,290,138 B2* | 3/2016 | Muraji | B62D 21/152 |
| 9,394,003 B2* | 7/2016 | Matsumoto | B62D 21/02 |

(Continued)

FOREIGN PATENT DOCUMENTS

DE 102013003911 A1 9/2014

*Primary Examiner* — Lori L Lyjak

(57) ABSTRACT

A vehicle body structure includes a front side member, a body attachment structure and an off-center impact structure. The body attachment structure is attached to an outboard wall of the front side member along a front-section forward of an outboard opening and extends in an outboard direction from the front side member. The off-center impact structure has an elongated member with a straight portion that extends through the outboard opening and into a hollow interior of the front side member. The elongated member is fixedly coupled to the outboard wall of the front side member adjacent to, spaced apart from and rearward of the body attachment structure. In response to an impact event of an off-center impact test the body attachment structure deforms and moves into contact with the elongated member transferring impact force to the elongated member.

20 Claims, 9 Drawing Sheets

(56) References Cited

U.S. PATENT DOCUMENTS

| | | |
|---|---|---|
| 9,415,805 B2 | 8/2016 | Fujikawa et al. |
| 9,676,416 B2 * | 6/2017 | Kitakata .............. B62D 21/152 |
| 9,771,106 B2 * | 9/2017 | Ogawa ................ B62D 21/152 |
| 9,855,971 B2 * | 1/2018 | Daido .................. B62D 21/152 |
| 2008/0023954 A1 | 1/2008 | Eichberger et al. |
| 2015/0021935 A1 | 1/2015 | Baccouche et al. |
| 2015/0298742 A1 | 10/2015 | Ono et al. |
| 2015/0360633 A1 | 12/2015 | Nishida et al. |

* cited by examiner

VEHICLE BODY STRUCTURE

BACKGROUND

Field of the Invention

The present invention generally relates to a vehicle structure. More specifically, the present invention relates to an off-center support structure attached to portions of a vehicle frame that responds to and absorbs impact force during an off-center impact test.

Background Information

Vehicle structures are routinely being redesigned to include structural features that absorb impact forces in response to impact events. Recently introduced impact event tests include an off-center impact test (also referred to as a small overlap test) where a vehicle is provided with velocity in a vehicle longitudinal direction (forward momentum) such that a front corner of the vehicle (approximately 25 percent of the overall width of the vehicle) impacts a fixed, rigid barrier. FIGS. 1, 2 and 3 schematically show an example of a conventional vehicle C undergoing an impact event with a fixed barrier B in accordance with the off-center impact test.

FIG. 1 shows the conventional vehicle C approaching the rigid barrier B in the off-center impact test. FIG. 2 shows the conventional vehicle C just after initial impact with the rigid barrier B showing initial deformation and forward momentum being transformed into rotational displacement about the rigid barrier B. FIG. 3 shows the conventional vehicle C undergoing further deformation and rotation as a result of the impact event.

SUMMARY

One object of the disclosure is to provide a vehicle frame with additional structural elements that absorb and redirect impact energy during an off-center impact test.

In view of the state of the known technology, one aspect of the present disclosure is to provide vehicle body structure with a front side member, a body attachment structure and an off-center impact structure. The front side member has a front end and a front-section extending rearward from the front end. The front side member defines a hollow interior and extends in a vehicle longitudinal direction. The front side member has an outboard wall and an inboard wall with an outboard opening extending through the outboard wall to the hollow interior. The body attachment structure is attached to the outboard wall of the front side member along the front-section forward of the outboard opening and extends in an outboard direction from the front side member. The off-center impact structure has an elongated member with a straight portion that extends through the outboard opening and into the hollow interior of the front side member. The elongated member is fixedly coupled to the outboard wall of the front side member adjacent to, spaced apart from and rearward of the body attachment structure. In response to an impact event of an off-center impact test the body attachment structure deforms and moves into contact with the elongated member transferring impact force to the elongated member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 4-10, a vehicle 10 is illustrated in accordance with a first embodiment. The vehicle 10 is provided with an off-center impact structure 12 (shown in FIGS. 8-12) that is configured to absorb and re-direct forces during an impact event such as an off-center impact test (also referred to as a small overlap test) described further below.

Figure 1:
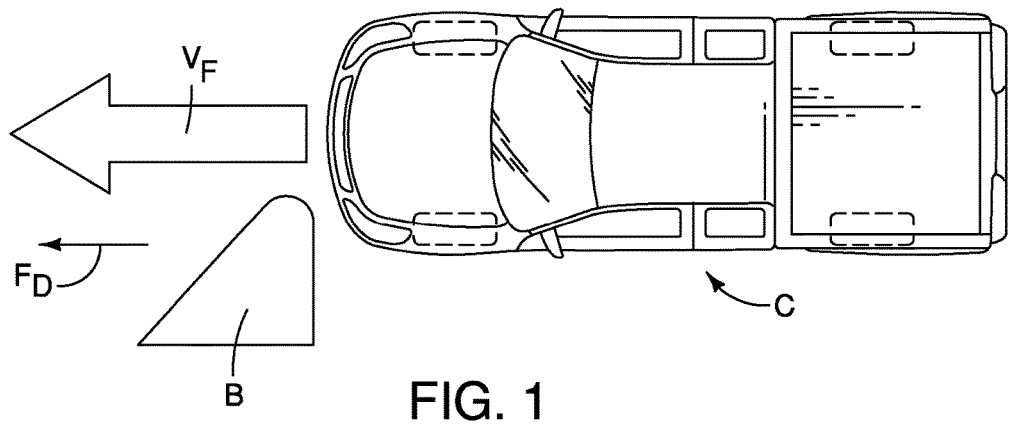
FIG. 1 is a schematic view of a conventional moving vehicle showing its response to a small overlap test where a front corner of the vehicle is aligned with a fixed, rigid barrier for eventual impact with the barrier.
Figure 2:
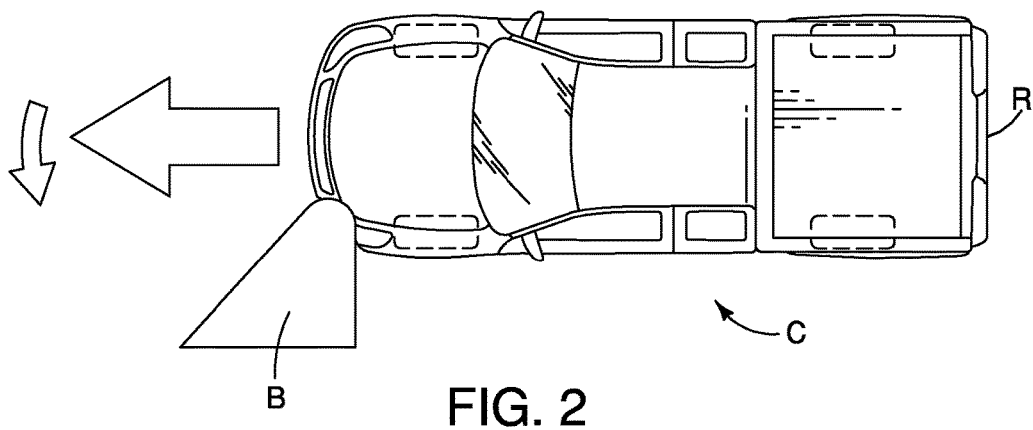
FIG. 2 is another schematic view of the conventional vehicle showing its response to the small overlap test at the beginning of an impact event with the front corner of the conventional vehicle impacting the barrier and beginning to undergo deformation.
Figure 3:
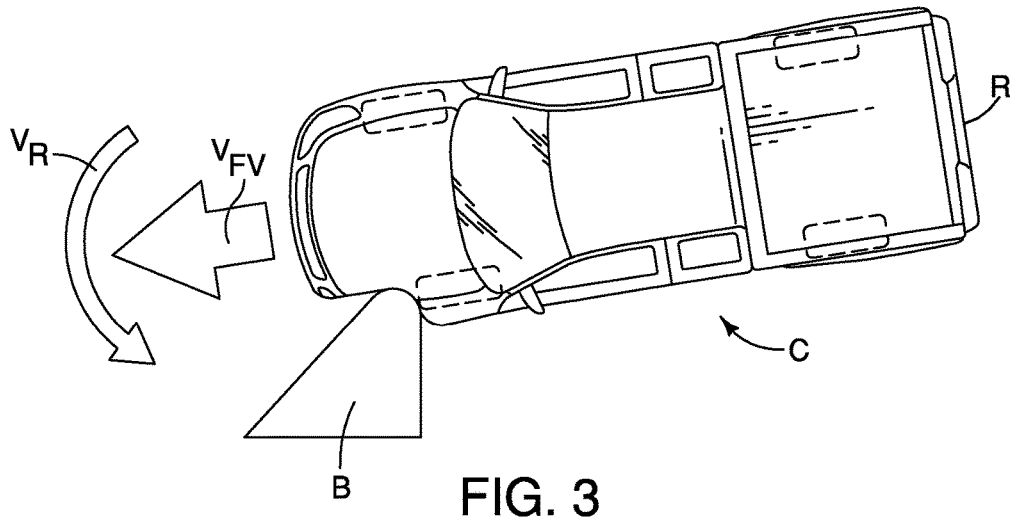
FIG. 3 is still another schematic view of the conventional vehicle showing its response to the small overlap test with the conventional vehicle undergoing further deformation during the impact event.

The Insurance institute for Highway Safety (IIHS) has developed various tests where vehicles are provided with forward velocity $V_F$ and impacted against fixed, rigid barriers, like the rigid barrier B depicted in FIGS. 1-3. In the IIHS offset tests, the conventional vehicle C is aimed at the rigid barrier B such that approximately 25 percent of the front area of the conventional vehicle C impacts the rigid barrier B. In other words, as indicated in FIGS. 1-3. only a front corner of the conventional vehicle C impacts the rigid barrier B. This IIHS test is also known as a frontal offset, narrow offset, or small overlap test, in such tests, a front bumper assembly of the conventional vehicle C is either not impacted, or undergoes only limited contact with the rigid barrier B during the impact event. Therefore, other structures at the front of the conventional vehicle C impact the rigid barrier B and absorb at least some of the kinetic energy associated with the rapid deceleration of the vehicle C that results from the impact event. When the vehicle C is provided with velocity and impacts the rigid barrier B, the rapid deceleration of the vehicle C transforms the kinetic energy associated with the mass times velocity of the vehicle C into deformation of the vehicle C and counter movement of the vehicle C. As is well known kinetic energy is a function of mass times velocity, During, the small offset test, the kinetic energy of the vehicle C is partially absorbed and partially transformed into other forms of kinetic energy, such as, rotary motion . It should be understood that the kinetic energy associated with the forward velocity of the vehicle C (and in the description below) is transformed into an impacting force upon impact due to the rapid deceleration of the vehicle C .Consequently hereinbelow, the terms impact force and impacting force as used herein correspond to the kinetic energy applied to the vehicle 10 during the small overlap test (the impact event), as described below with respect to the various embodiments.

The test developed by the IIHS is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response in that during the impact event with the rigid barrier B, the rear end R of the conventional vehicle C undergoes some rotation and swings laterally away from the rigid barrier B, as indicated in FIG. 3.

In other words, the forward velocity $V_F$ of the conventional vehicle C as it moves is transformed upon impact with the rigid barrier B. The velocities $V_{FV}$ and $V_R$ are the result in an equal and opposite reaction force acting on the vehicle C as the vehicle C suddenly decelerates. It is desirable to move the vehicle laterally outward from the barrier and avoid unnecessary loading of the dash-wall and/or A-pillar.

Figure 4:
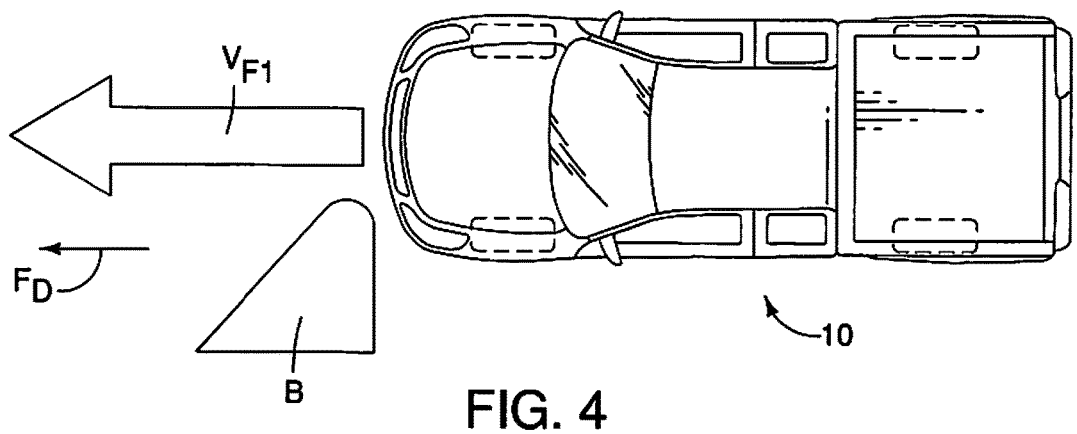
FIG. 4 is a schematic view of a moving vehicle being subjected to a small overlap test where approximately 25 percent of the front of the vehicle aligned with a fixed, rigid barrier for eventual impact with the barrier in accordance with a first embodiment.
Figure 5:
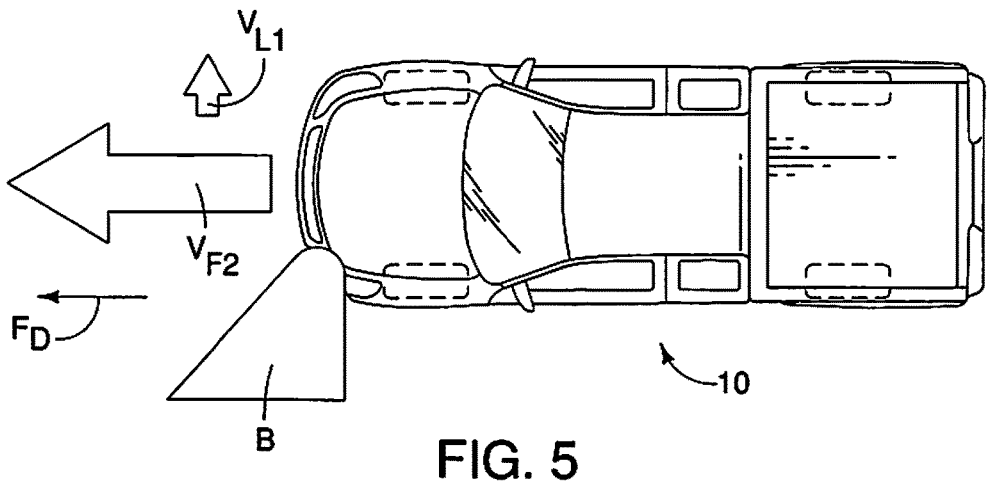
FIG. 5 is another schematic view of the vehicle depicted in FIG. 4 showing an initial response to the impact event of the small overlap test with a front corner of the vehicle impacting the barrier and beginning to undergo deformation in accordance with the first embodiment.
Figure 6:
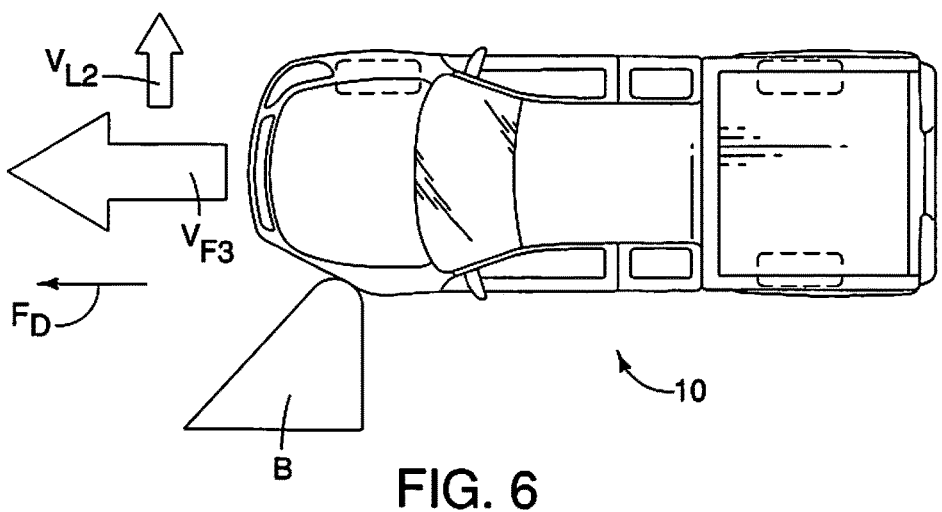
FIG. 6 is still another schematic view of the vehicle depicted in FIGS. 4 and 5 showing a subsequent response to the impact event of the small overlap test with the moving vehicle undergoing further deformation during the impact event in accordance with the first embodiment.

The force directing features of the off-center impact structure 12 of the vehicle 10 as described hereinbelow are such that during an impact event (such as a small overlap test), the impact forces are absorbed and transmitted to various structures within the vehicle 10, as shown in FIGS. 4, 5 and 6. Specifically, in FIG. 4 the vehicle 10 is provided with a forward velocity $V_{F1}$ and is subjected to a small overlap test where approximately 25 percent of the front of the vehicle is aligned with the rigid barrier B. In FIG. 5 the vehicle 10 undergoes an initial response to the impact event of the small overlap test with a front corner of the vehicle impacting the barrier and beginning to undergo deformation. Hence, the forward velocity $V_{F1}$ is reduced to a velocity $V_{F2}$ with some of the impact energy causing the vehicle 10 to move laterally with a velocity $V_{L1}$, as shown in FIG. 5. In FIG. 6, the vehicle 10 undergoes a subsequent response to the impact event in that one or more of the features of the off-center impact structure 12 has functioned properly and caused the vehicle 10 to move laterally with the forward velocity $V_{F2}$ is reduced to a velocity $V_{F3}$ and a lateral velocity $V_{L2}$ that is greater than the $V_{L1}$. In other words, the off-center impact structure 12 is configured to absorb impact energy and direct that force to various portions of the vehicle, and the off-center impact structure 12 is also configured to move the vehicle 10 in a lateral direction away from the barrier B.

It should be understood from the drawings and the description herein, that during an impact event, such as the small overlap test, the reaction forces experienced by the vehicle 10 as it impacts the rigid barrier B are significant. These significant reaction forces are exponentially greater than the forces the structures of the vehicle 10 undergo during normal operating usage of the vehicle 10. In other words, the impact events referred to herein are intended as destructive tests. Further, the impact events of the small overlap tests are configured such that the vehicle 10 impacts the rigid barrier B at portions of the vehicle 10 outboard of some of the vehicle's structures (not a central area of the vehicle 10), as described in greater detail below.

In the various embodiments described below, the vehicle 10 includes combinations of features of the off-center impact structure 12 shown in FIGS. 9 and 10, and described further below.

Figure 7:
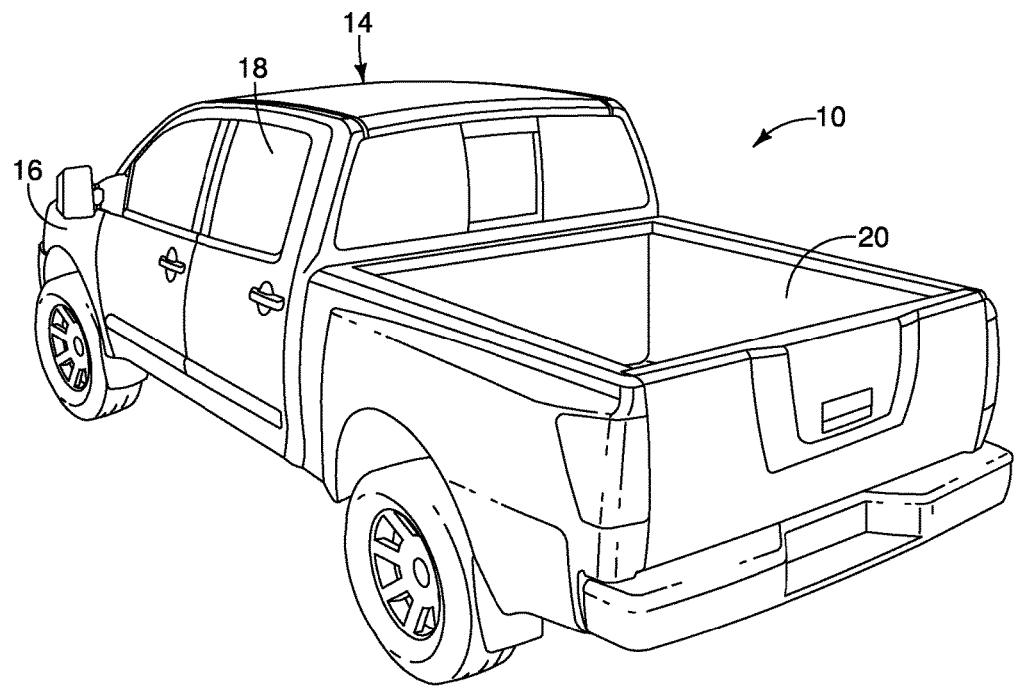
FIG. 7 is a perspective view of the vehicle having an off-center impact structure in accordance with the first embodiment.

FIG. 7 shows one embodiment of the vehicle 10. In FIG. 7, the vehicle 10 is depicted as a pickup truck that includes a body structure 14 that defines, for example, an engine compartment 16, a passenger compartment 18 and a cargo area 20. The body structure 14 is installed to and rests on a frame 22. The frame 22 is shown removed from the vehicle 10 in FIGS. 8 and 9. Specifically, FIG. 8 shows the frame 22 with the off-center impact structure 12 installed thereto, and FIG. 9 shows only a front area of the frame 22 with the off-center impact structure 12 installed thereto.

In FIG. 7, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structure 12 described below can be configured for smaller vehicles or larger vehicles and is not limited to usage in a heavy-duty vehicle such as the vehicle 10. In other words, the off-center impact structure 12 can be used on any size vehicle that includes a frame such as the frame 22 where the body structure 14 attaches to and is supported by the frame 22. It should also be understood from the drawings and description, that the off-center impact structure 12 can also be employed with a unibody vehicle. A unibody vehicle is a vehicle that does not typically includes a separate frame such as the frame 22. Rather, the unibody vehicle includes various structural elements welded together. Elements of the unibody vehicle serve as frame elements functionally equivalent to the elements of the frame 22. For example, U.S. Pat. No. 8,870,267 assigned to Nissan North America, discloses a unibody vehicle body structure. The front structural support portions (30) disclosed in U.S. Pat. No. 8,870,267 are basically vehicle side members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 12 can be installed to portions of the unibody vehicle disclosed in U.S. Pat. No. 8,870,267 and portions of the engine cradle of U.S. Pat. No. 8,870,267. Both U.S. Pat. No. 8,870,267 and U.S. Pat. No. 9,180,913 are incorporated herein by reference in their entirety. Since unibody vehicles are conventional structures, further description is omitted for the sake of brevity.

Figure 8:
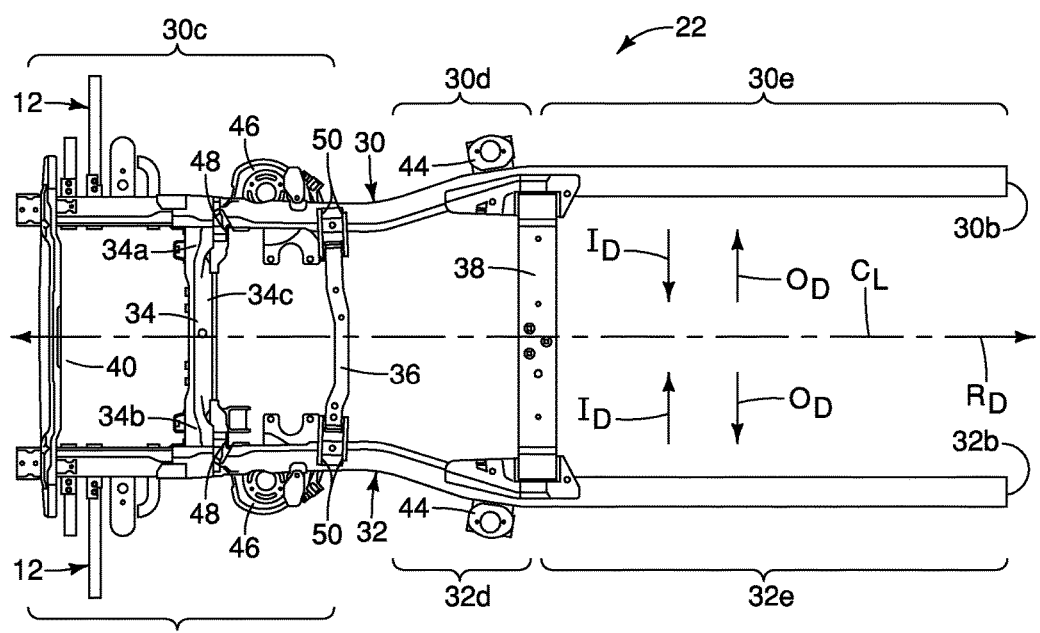
FIG. 8 is a bottom view (looking upward) of a frame from the vehicle depicted in FIG. 7, showing two sets of the off-center impact structures attached to respective a front side members at either side of the frame in accordance with the first embodiment.
Figure 9:
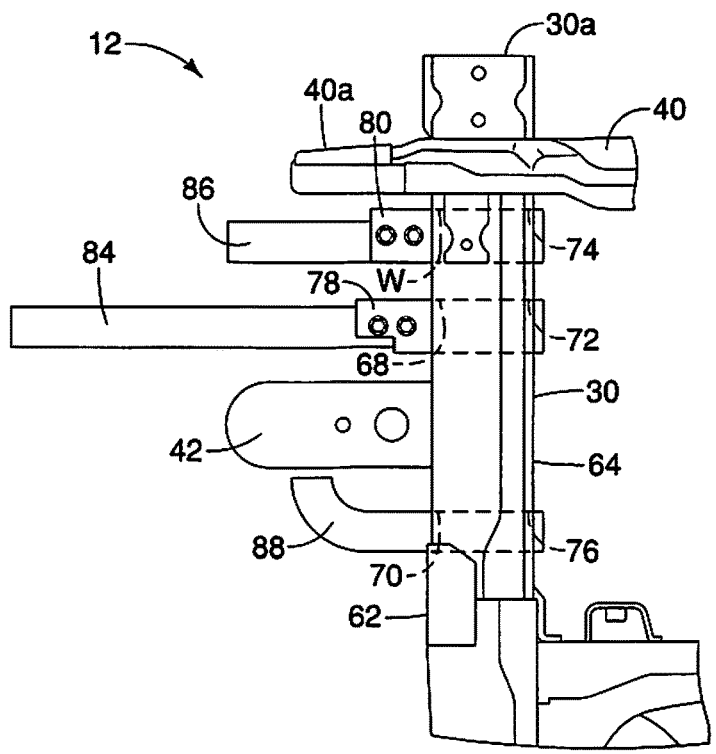
FIG. 9 is a top view (looking downward) of a driver's side portion of the frame depicted in FIG. 8, with the off-center impact structure installed to the frame structure in accordance with the first embodiment.

The off-center impact structure 12 is shown in FIGS. 8 and 9 installed to specific portions of the frame 22.

In FIG. 8 several directions relative to the frame 22 (and the vehicle 10) are shown in order to define orientations of the various features of the vehicle 10 and the off-center impact structure 12. Specifically, the vehicle 10 and the frame 22 define a longitudinal center line $C_L$ that extends in a lengthwise direction of the vehicle 10 along a central portion of the vehicle 10. At a left-hand side of FIG. 8, a forward direction $F_D$ is indicated by the depicted arrow, and at a right-hand side of FIG. 8 a rearward direction $R_D$ is indicated by the depicted arrow. As well, inboard directions $I_D$ and outboard directions $O_D$ relative to the longitudinal center line $C_L$ are also shown in FIG. 8.

As shown in FIG. 8, the frame 22 includes a front side member 30, a second side member 32, a first cross-member 34, a second cross-member 36 and a third cross-member 38 and a front cross-member 40. FIG. 8 shows an underside of the frame 22. In other words, the depiction of the frame 22 is taken from below the frame 22 looking upward. The frame 22 is made of heavy gauge steel, but can alternatively be made of other materials depending upon the overall design of the vehicle 10. It should therefore be understood that the front side member 30 extends along and under a driver's side of the vehicle 10, and the second side member 32 extends along and under a passenger's side of the vehicle 10.

The front side member 30 is an elongated beam (a first side member) that has multiple contours and shapes. Specifically, the front side member 30 has a front end 30a and a rear end 30b. The front side member 30 also has a first portion 30c, a second portion 30d and a third portion 30e. The first portion 30c extends in the rearward direction $R_D$ from the front end 30a to a location proximate the second cross-member 36. The first portion 30c is generally straight. The second portion 30d has a curved shape such that just rearward of the first portion 30c, the second portion 30d gradually curves in the outboard direction $O_D$. The third portion 30e is generally straight, but can include contours and curves, depending upon the overall design of the vehicle 10.

Similarly, the second side member 32 is an elongated beam (a second side member) that has multiple contours and shapes that are symmetrical to the front side member 30. Specifically, the second side member 32 has a front end 32a and a rear end 32b. The second side member 32 also has a first portion 32c, a second portion 32d and a third portion 32e. The first portion 32c extends in the rearward direction $R_D$ from the front end 32a to a location proximate the second cross-member 36. The first portion 32c is generally straight. The second portion 32d has a curved shape such that just rearward of the first portion 32c, the second portion 32d gradually curves in the outboard direction $O_D$.

The first portions 30c and 32c of the first and second side members 30 and 32 are a first distance away from one another, and the third portions 30e and 32e are a second distance away from one another, with the second distance being greater than the first distance.

The first and second side members 30 and 32 each include body attachment structures 42 and 44 (also referred to as attachment flanges). The body attachment structures 42 and 44 are welded to the first and second side members 30 and 32 and are dimensioned and shaped to attach to the body structure 14 of the vehicle 10. The body attachment structures 42 extend from outboard sides of the first portions 30c and 32c of the first and second side members 30 and 32 forward of the first cross-member 34. The body attachment structures 44 extend from outboard sides of the second portions 30d and 32d of the first and second side members 30 and 32 rearward of the second cross-member 36.

Although not shown in FIG. 8, the third portions 30e and 32e of the first and second side members 30 and 32 can also include additional body attachment structures configured for attachment to structures that define the cargo area 20 of the vehicle 10. Further, the third portions 30e and 32e can be at the same level above the ground as the first portions 30c and 32c, or can be raised above the ground at a level higher that the first portions 30c and 32c, with the second portions 30d and 32d including an upward curvature.

As shown in FIG. 8, each of the first portions 30c and 32c of the first and second side members 30 and 32 further include front suspension structures such as coil spring supports 46, first suspension structures 48 and second suspension structures 50.

The coil spring supports 46 are rigidly fixed (i.e. welded) to respective ones of the first and second side members 30 and 32. The coil spring supports 46 are dimensioned and shaped to support lower ends of front suspension coil springs in a conventional manner. Since front suspension coil springs are conventional structures, further description is omitted for the sake of brevity.

The first suspension structures 48 are defined by pairs of flanges welded to lower surfaces of the first and second side members 30 and 32. Similarly, the second suspension structures 50 are defined by pairs of flanges welded to lower surfaces of the first and second side members 30 and 32 rearward and spaced apart from the first suspension structures 48. The first suspension structures 48 are adjacent to or aligned with the first cross-member 34. The second suspension structures 50 are adjacent to or aligned with the second cross-member 36.

The first suspension structures 48 and the second suspension structures 50 are configured to support a lower control arm (not shown) for pivotal movement about pivot bolts 54. The lower control arm is part of the steering and suspension structure of the vehicle 10. Since steering and suspension structures (and, in particular, control arm structures) are conventional vehicle components, further description is omitted for the sake of brevity.

The engine compartment 16 of the body structure 14 is approximately located in the space above and between the first portions 30c and 32c of the first and second side members 30 and 32. A front portion of the passenger compartment 18 is located in the space above and between the second portions 30d and 32d of the first and second side member rearward of the engine compartment 16. The remainder of the passenger compartment 18 and the cargo area 20 of the body structure 14 are located above the third portions 30e and 32e of the first and second side members 30 and 32.

As shown in FIGS. 8 and 9, the first cross-member 34 is rigidly attached to the front side member 30 and rigidly attached to the second side member 32. The first cross-member 34 can be co-planar with the first and second side members 30 and 32, or can be located above or below the first and second side members 30 and 32. The first cross-member 34 has a first end 34a, a second end 34b and mid-section 34c that extends from the first end 34a to the second end 34b. The first end 34a of the first cross-member is fixed to the front side member 30.

In the depicted embodiment, the first cross-member 34 extends in a vehicle lateral direction from the first portion 30c of the front side member 30 to the first portion 32c of the second side member 30 at a location rearward of the front ends 30a and 32a. The first cross-member 34 is further rigidly fixed to each of the front side member 30 and the second side member 32. As shown in FIGS. 8 and 9, the first cross-member 34 extends perpendicular to the first portion 30c of the front side member 30 and the first portion 32c of the second side member 32.

The second end 34b of the first cross-member 34 is also fixed to the second side member 32 in a manner consistent with the attachment of the first end 34a to the front side member 30. Since the attachment of the second end 34b to the second side member 32 is basically the same as the attachment of the first end 34a to the front side member 30, further description of the attachment of the first cross-member 34 to the second side member 32 is omitted for the sake of brevity.

The second cross-member 36 extends in the vehicle lateral direction and is rigidly fixed to areas of each of the front side member 30 and the second side member 32 rearward of the first cross-member 34. The second cross-member 36 can be welded to each of the first portions 30c and 32c of the first and second side members 30 and 32. However, the second cross-member 36 can be attached to the first and second side members 30 and 32 via mechanical fasteners (not shown).

An engine receiving space is defined in the area confined between the first and second cross-members 30 and 32, and between the first and second side members 34 and 36.

The third cross-member 38 extends between forward ends of each of the third portions 30e and 32e of the first and second side members 30 and 32. The third cross-member 38 is welded to each of the first and second side members 30 and 32 and can serve as an attachment structure for a rear portion of the body structure 14 (at a mid-portion of the passenger compartment 18), and/or can serve as an attachment structure for the structure that defines the cargo area 20.

The front cross-member 40 is welded or otherwise rigidly fixed to the front ends 30a and 32a of the first and second side members 30 and 32. A bumper structure (not shown) can be attached to the front cross-member 40. Alternatively, the bumper structure (not shown) can be attached to the front ends 30a and 32a of the first and second side members 30 and 32 replacing the front cross-member 40.

The front cross member 40 is attached to the front side member 30 at or adjacent to the front end 30a of the front side member 30. The front cross member 40 includes an outboard portion 40a that extends from the front side member 30 forward of the off-center impact structure 12 in the outboard direction $O_D$. In response to an impact event of an off-center impact test, the outboard portion 40a of the front cross member 40 deforms and can contact a portion of the off-center impact structure 12, as described in greater detail below.

A description of the off-center impact structure 12 is now provided with specific reference to FIGS. 9-12. As is shown in FIG. 8, one of the off-center impact structures 12 is installed to the front side member 30 and another one of the off-center impact structures 12 is installed to the front side member 32. The two off-center impact structures 12 are symmetrically arranged relative to the longitudinal center line $C_1$ of the vehicle 10. The two off-center impact structures 12 are basically identical, except that they are mirror images of one another. Consequently, description of one of the off-center impact structures 12 applies equally to the other. Therefore, only one of the off-center impact structures 12 is described herein below for the sake of brevity.

Figure 10:
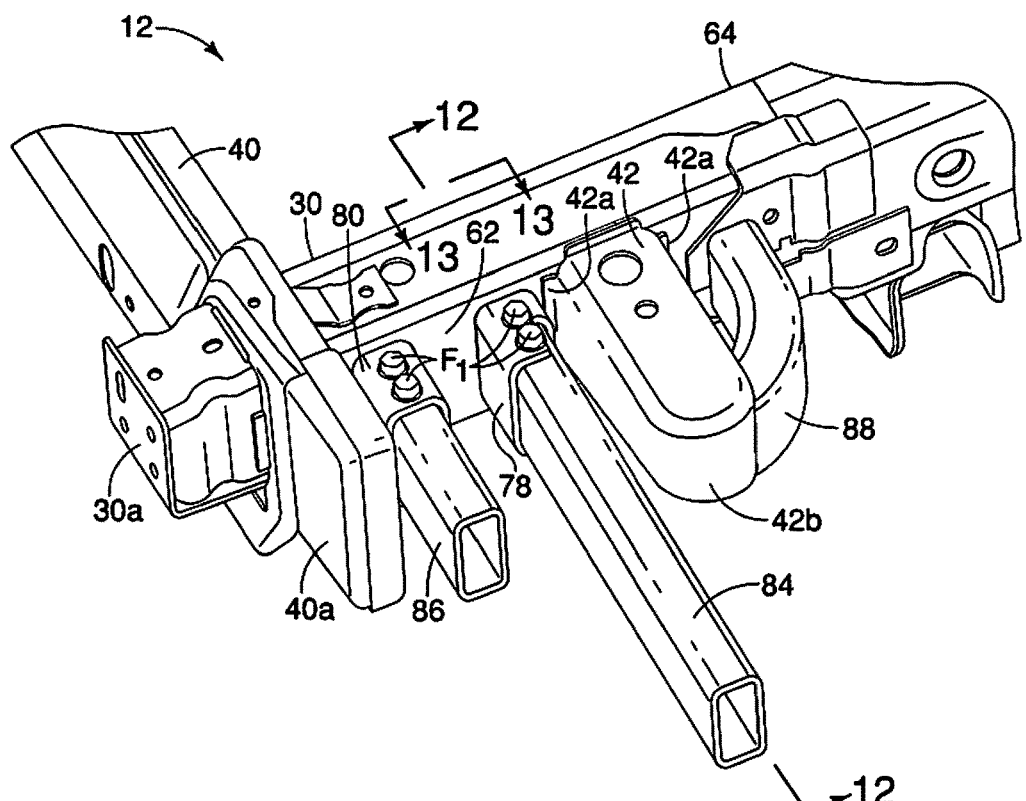
FIG. 10 is a perspective view of the driver's front side of the frame and the off-center impact structure, showing details of the off-center impact structure in accordance with the first embodiment.

Each of the elements and structures that define the off-center impact structure 12 is connected to, supported to and/or directly attached to the front side member 30, as shown in FIGS. 9 and 10.

Figure 11:
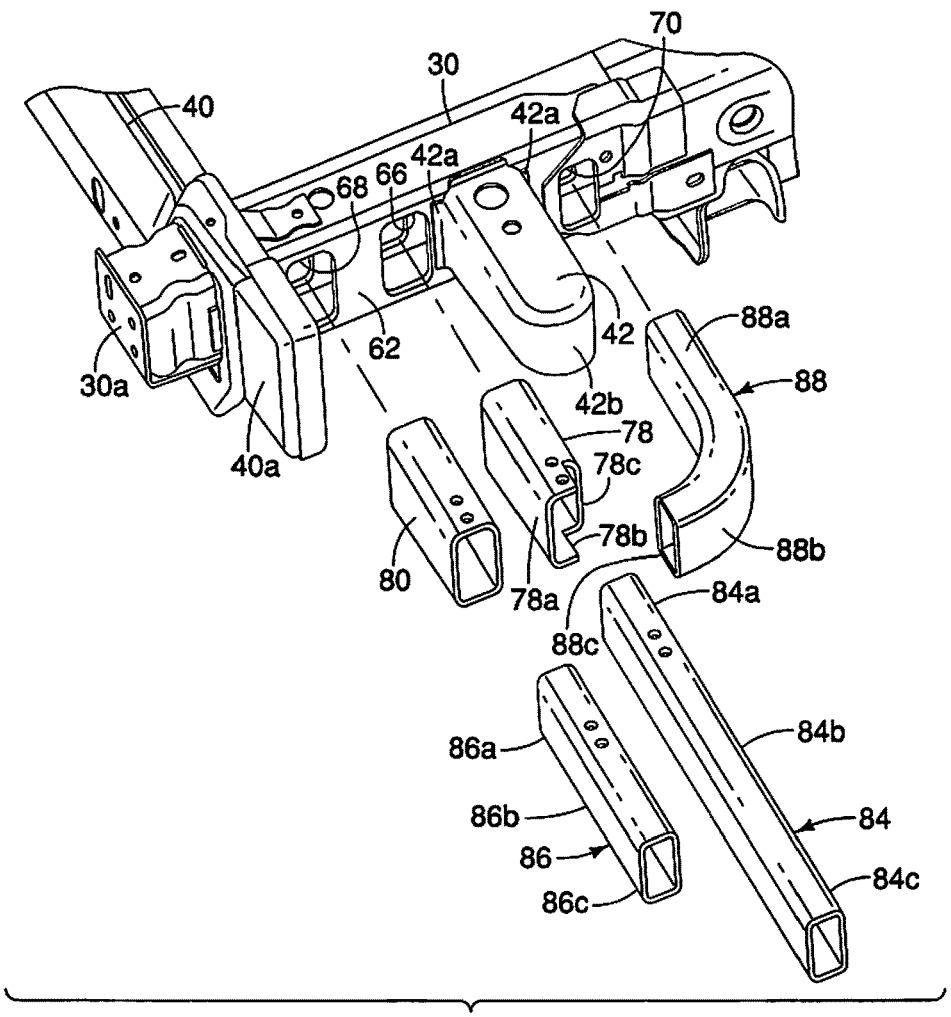
FIG. 11 is an exploded perspective view of the driver's front side of the frame and the off-center impact structure, showing details of the off-center impact structure in accordance with the first embodiment.
Figure 12:
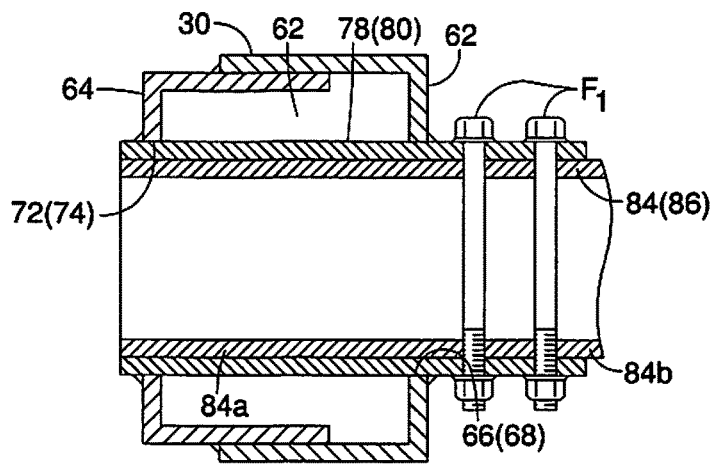
FIG. 12 is a cross-sectional view of the frame and a portion of the off-center impact structure taken along the line 12-12 in FIG. 10, showing details of the portion of the off-center impact structure in accordance with the first embodiment.

In the depicted embodiment as shown in FIG. 11, the front side member 30 defines a hollow interior 60. The first portion 30c (also referred to as the front-section) of the front side member 30 extends in a rearward direction from the front end 30a of the front side member 30 in a vehicle longitudinal direction parallel to the longitudinal center line $C_1$. As shown in FIG. 12, the front side member 30 has an outboard wall 62 and an inboard wall 64.

The outboard wall 62 defines a first outboard opening 66 (also referred to as a first forward outboard opening) that extends through the outboard wall 62 and to the hollow interior 60. The outboard wall 62 also defines a second outboard opening 68 (also referred to as a second forward outboard opening) that extends through the outboard wall 62 and to the hollow interior 60. The second outboard opening 68 is forward of the first outboard opening 68, such that the first outboard opening 68 is located between the second outboard opening and the body attachment structure 42. The outboard wall 62 also includes a rearward outboard opening 70 that extend through the outboard wall 62 and to the hollow interior 60. The rearward outboard opening 70 is located adjacent to and rearward of the body attachment structure 42.

The inboard wall 64 of the front side member 30 defines a first inboard opening 72 (also referred to as the first forward inboard opening) that is aligned with the first outboard opening 66 relative to the inboard direction $I_D$ and the outboard direction $O_D$ (lateral directions) of the front side member 30. The inboard wall 64 of the front side member 30 has a second inboard opening 74 (also referred to as a second forward inboard opening) aligned with the second outboard opening 68. The inboard wall 64 also includes a rearward inboard opening 76 that extend through the inboard wall 64 and to the hollow interior 60. The rearward inboard opening 76 is aligned with the rearward opening 70 and is also located rearward of the body attachment structure 42.

As shown in FIGS. 9-11, the first outboard opening 66 and the first inboard forward opening 72 are located forward of the body attachment structure 42. Further, the second outboard opening 68 and the second inboard opening 74 are located forward of the first outboard opening 66 and the first inboard forward opening 72. The body attachment structure 42 is attached to the outboard wall 62 of the front side member 30 along the front portion 32 (the front-section) rearward of the first outboard opening 66 via, for example, welding techniques.

The off-center impact structure 12 basically includes the body attachment structures 42, a first sleeve 78, a second sleeve 80, a first elongated member 84, a second elongated member 86 and a rearward elongated member 88. As described below, each of the body attachment structures 42, the first sleeve 78, the second sleeve 80, the first elongated member 84, the second elongated member 86 and the rearward elongated member 88 is connected to, supported to and/or directly attached to the front side member 30, as shown in FIGS. 9 and 10.

As shown in FIGS. 8-11, the body attachment structure 42 is directly attached to the outboard wall 62 of the front side member 30 along the front-section 30*c* rearward of the first outboard opening 66. The body attachment structure 42 extends in the outboard direction $O_D$ from the front side member 30. The body attachment structure 42 includes attachment flanges 42*a* that are welded to the outboard wall 62 of the front side member 30. The flanges 42*a* have an overall height that is approximately equal to or slightly less than an overall height of the outboard wall 62 of the front side member 30, as shown in FIG. 11. The body attachment structure 42 also includes a skirt or wall 42*b* that curves around an outer periphery of the body attachment structure 42 and further extends to the flanges 42*a*. More specifically, the wall 42*b* has an overall height that is constant around the body attachment structure 42. The overall height of the wall 42*b* is approximately equal to the height of each of the flanges 42*a*.

As shown in FIGS. 9-12, the first sleeve 78 is a hollow beam member with open ends that expose a hollow interior of the first sleeve 78. The first sleeve 78 is inserted through the first outboard opening 66 through the hollow interior 60 and to the first inboard opening 72 of the front side member 30. A portion 78*a* of the first sleeve 78 extends laterally outward in the outboard direction $O_D$ from the outboard wall 62. The first sleeve 78 basically defines a tunnel through the front side member 30. The first sleeve 78, like the front side member 30, is preferably made of a metallic material such as steel and is fixedly attached to the outboard wall 62 and the inboard wall 64. For example, the first sleeve 78 can be welded to the outboard wall 62 and welded to the inboard wall 64, but can alternatively be attached to the front side member 30 via mechanical fasteners.

Figure 13:
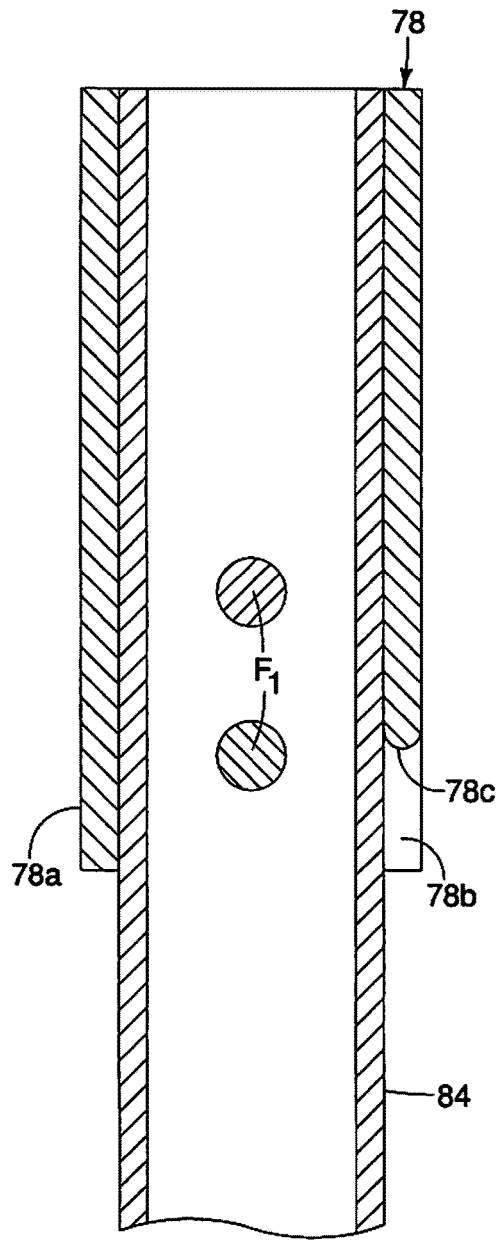
FIG. 13 is a cross-sectional view of the frame and a portion of the off-center impact structure taken along the line 13-13 in FIG. 10, showing details of a first sleeve and a first elongated member of the off-center impact structure in accordance with the first embodiment.
Figure 14:
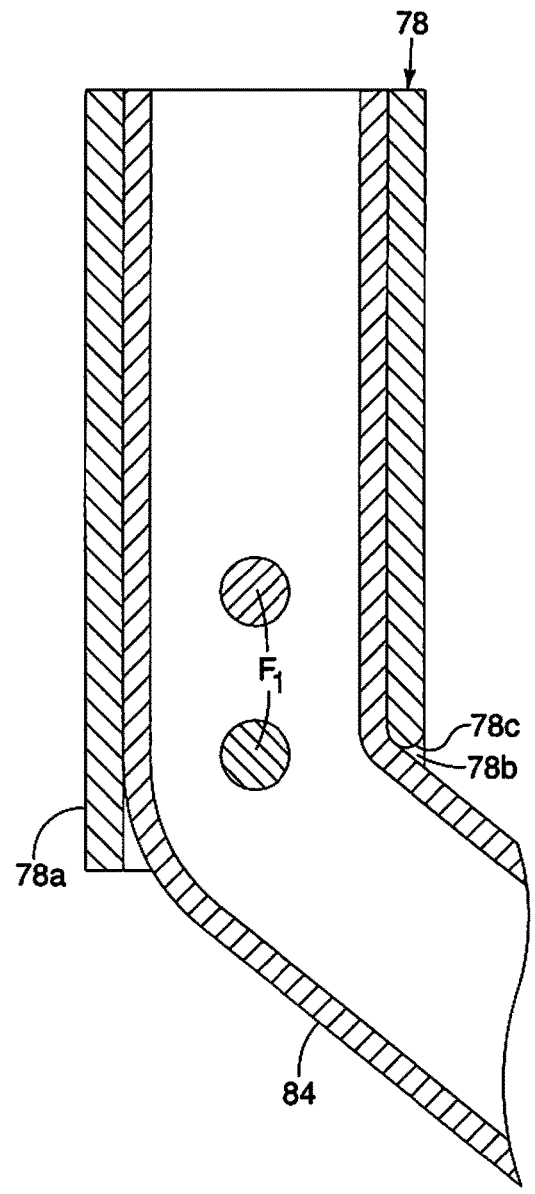
FIG. 14 is a cross-sectional view of the frame and the portion of the off-center impact structure shown in FIG. 13, showing the first elongated member of the off-center impact structure in a deformed condition after an impact event in accordance with the first embodiment.

As shown in FIG. 13, the portion 78*a* of the first sleeve 78 that extends laterally outward from the outboard wall 62 includes a recessed area 78*b*. A rearward edge of the recessed area 78*b* of the first sleeve 78 includes a beveled or curved surface 78*c*. As is described further below (and shown in FIG. 14) the curved surface 78*c* is provided to guide deformation of the first elongated member 84 during an impact event of a small overlap test.

The second sleeve 80 is also a hollow beam member with open ends that expose a hollow interior of the second sleeve 80. The second sleeve 80 is inserted through the second outboard opening 68 through the hollow interior 60 and to the second inboard opening 74 of the front side member 30. A portion of the second sleeve 80 extends laterally outward in the outboard direction $O_D$ from the outboard wall 62. The second sleeve 80 basically defines a tunnel through the front side member 30 that is parallel to and forward relative to the tunnel defined by the first sleeve 78. The second sleeve 80 is preferably made of a metallic material such as steel and is fixedly attached to the outboard wall 62 and the inboard wall 64. For example, the second sleeve 80 can be welded to the outboard wall 62 and welded to the inboard wall 64, but can alternatively be attached to the front side member 30 via mechanical fasteners.

As shown in FIG. 11, the first elongated member 84 is linearly shaped defines a first end portion 84*a*, a mid-portion 84*b* (mid-section or mid-section portion) and a second end portion 84*c*. The first end portion 84*a* of the first elongated member 84 extends through the first outboard opening 66 into the hollow interior of the front side member 30. The first elongated member 84 is rigidly connected to the front side member 30 forward of the body attachment structure 42. The mid-portion 84*b* is connected to the front side member 30 (via the first sleeve 78) at a location proximate the outboard wall 62. The second end portion 84*c* extends in the outboard direction $O_D$ away from the outboard wall 62 of the front side member 30 such that in response to an impact event during an off-center impact test the mid-portion 84*b* of the first elongated member 84 deforms with the second end portion 84*c* moving rearward into contact with the body attachment structure 42.

Figure 15:
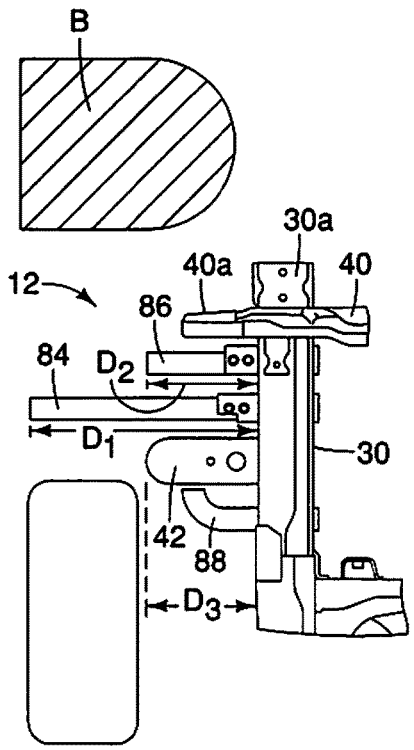
FIG. 15 is a schematic view of the vehicle and the off-center impact structure being subjected to a small overlap test where approximately 25 percent of the front of the vehicle aligned with the fixed, rigid barrier for eventual impact with the barrier in accordance with the first embodiment.

The first end portion 84*a* of the first elongated member 84 is inserted into the hollow interior of the first sleeve 78 and is fixedly thereto via removable fasteners $F_1$ and/or via welding techniques. Since the first end portion 84*a* is fixed to the first sleeve 78, the first end portion 84*a* of the first elongated member 84 is connected to the inboard wall 64 proximate the first inboard opening 72. As shown in FIG. 15, the first elongated member 78 extends laterally outboard from the front side member 30 by a first distance $D_1$ in a direction that is perpendicular to that portion of the front side member 30 proximate the first outboard opening 66.

As also shown in FIG. 11, the second elongated member 86 is linearly shaped defines a first end portion 86*a*, a mid-portion 86*b* (mid-section or mid-section portion) and a second end portion 86*c*. The first end portion 86*a* of the second elongated member 86 extends through the second outboard opening 68 into the hollow interior of the front side member 30. The second elongated member 86 is rigidly connected to the front side member 30 forward of the body attachment structure 42 and the first elongated member 84. The mid-portion 86*b* is connected to the front side member 30 (via the second sleeve 80) at a location proximate the outboard wall 62. The second end portion 86c extends in the outboard direction $O_D$ away from the outboard wall 62 of the front side member 30 such that in response to an impact event during an off-center impact test the mid-portion 86b of the second elongated member 86 deforms with the second end portion 86c moving rearward into contact with the first elongated member 84.

More specifically, the first end portion 86a of the second elongated member 86 is inserted into the hollow interior of the second sleeve 80 and is fixedly thereto via removable fasteners $F_1$ and/or via welding techniques. Since the first end portion 86a is fixed to the second sleeve 80, the first end portion 86a of the second elongated member 86 is connected to the inboard wall 64 proximate the second inboard opening 74. As shown in FIG. 15, the second elongated member 86 extends laterally outboard from the front side member 30 by a second distance $D_2$ in a direction that is perpendicular to that portion of the front side member 30 proximate the second outboard opening 68. The first distance $D_1$ is greater than the distance $D_2$. In a non-impacted state the first elongated member 84 and the second elongated member 86 are parallel to one another.

As is also shown in FIG. 15, the body attachment structure 42 extends laterally outboard from the front side member 30 by a third distance $D_3$ in a direction that is perpendicular to the adjacent portion of the front side member 30. The first distance $D_1$ is greater than the distance $D_2$, and the second distance $D_2$ is greater than the third distance $D_3$. In a non-impacted state the first elongated member 84, the second elongated member 86 and the body attachment structure 42 are all parallel to one another.

The rearward elongated member 88 (also referred to as third elongated member or simply the elongated member). The rearward elongated member 88 includes straight portion 88a and a curved portion 88b that together defining an overall J-shape as viewed from above in FIGS. 9 and 15. The straight portion 88a extends in a direction that is perpendicular to the front side member 30. The straight portion 88a is inserted into the rearward outboard opening 70, into the hollow interior 60 and through the rearward inboard opening 76. The straight portion 88a is fixed to both the outboard wall 62 and the inboard wall 64 of the front side member 30 by, for example, welding techniques. Alternatively, as described below in a second embodiment, a third sleeve can be installed to the front side member 30 for installing and supporting the rearward elongated member 88. The curved portion 88b has a flat end surface 88c that faces a rearward side of the body support structure 42.

The third elongated member 88 is fixedly coupled to the outboard wall 62 of the front side member 30 adjacent to and rearward of the body attachment structure 42. Specifically, the third elongated member 88 is spaced apart from and rearward of the body attachment structure 42 in the non-impacted state. In response to the impact event of the off-center impact test the body attachment structure 42 can deform and move into contact with the flat end surface 88c of the third elongated member 88 transferring impact energy from the body attachment structure 42 to the third elongated member 88. In the non-impacted state, as shown in FIGS. 9 and 15, the flat end surface 88c is perpendicular to the outboard wall 62 of the front side member 30. Further, the flat end surface 88c faces the rearward surface of the body attachment structure 42, and the flat end surface 88c is parallel to the adjacent rearward surface of the body attachment structure 42.

The rearward elongated member 88 extends outboard away from the outboard wall 62 of the front side member 30 by a distance that is less than each of the first, second and third distances $D_1$, $D_2$ and $D_3$.

Figure 16:
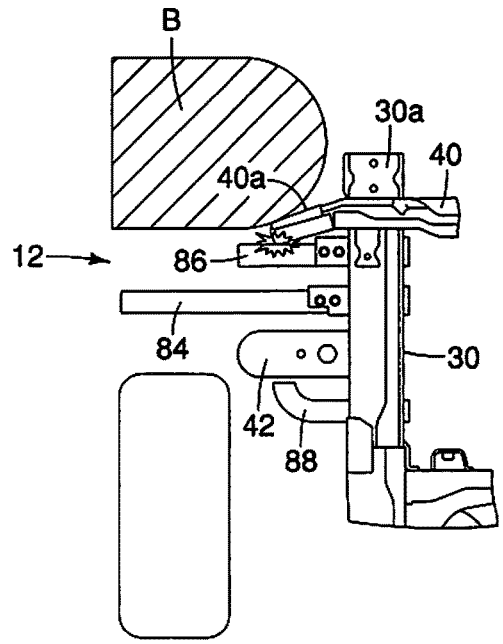
FIG. 16 is another schematic view of the vehicle depicted in FIG. 13 showing an initial response to the impact event of the small overlap test with the off-center impact structure impacting the barrier and beginning to undergo deformation in accordance with the first embodiment.
Figure 17:
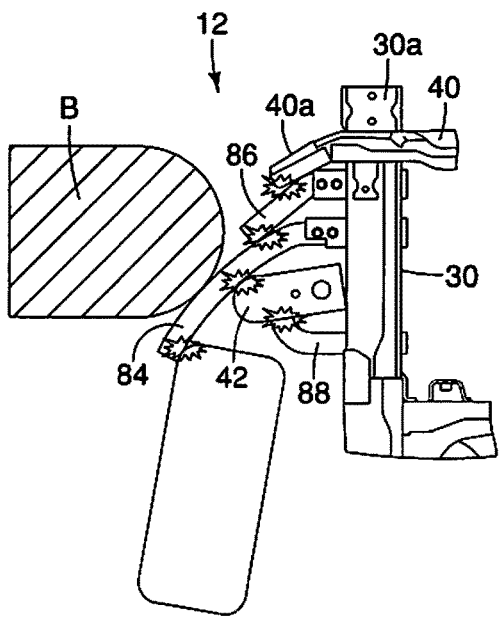
FIG. 17 is still another schematic view of the vehicle depicted in FIGS. 13 and 14 showing a subsequent response to the impact event of the small overlap test with the off-center impact structure undergoing further deformation during the impact event in accordance with the first embodiment.

As shown in FIGS. 15-17, the off-center impact structure 12 can be configured to provide various responses to an impact event during an off-center overlap test. First, during an impact event of a small overlap impact test, the vehicle 10 is moved toward the barrier B at a predetermined velocity (FIG. 15). Initially, the barrier B can impact the outboard portion 40a of the front cross-member 40 of the frame 22 (FIG. 16). The outboard portion 40a is configured to bend or otherwise deform, moving into contact with the second elongated member 86 and absorbing impact energy as a result of bending and/or deformation. As shown in FIG. 17, subsequent contact with the barrier B can cause the second elongated member 86 to deform and move into contact with the first elongated member 84. As a result of the above contact with the outboard portion 40a, the second elongated member 86 and/or the first elongated member 84, the impacting between the off-center impact structure 12 of the vehicle 10 and the barrier B in the small overlap impact test causes the vehicle 10 to be pushed laterally away from the barrier B, as shown in FIGS. 4-6.

Further, depending upon the velocity of the vehicle 10 during the impact event of the small overlap impact test, the barrier B and the first elongated member 84 can make contact, as shown in FIG. 17. As the impact event continues (milli-seconds later) as shown in FIG. 17, the impact force of the impact event acting on the off-center impact structure 12 can cause the first elongated member 84 to deform about the curved surface 78c of the first sleeve 78, with continuing deformation causing the first elongated member 84 to contact the body attachment structure 42.

Impact energy absorbed by the body attachment structure 42 is transferred to the front side member 30 of the frame 22, and also to the body structure 14, which is directly fixedly attached to the body attachment structure 42 via removable fasteners (not shown). If there is sufficient impact energy during the impact event, it is also possible for the body attachment structure 42 to deform and move rearward into contact with the rearward elongated member 88. Contact between the body attachment structure 42 and the rearward elongated member 88 provides further absorption of impact energy that is transferred to the frame 22 via the rearward elongated member 88. Further, if the impact energy is sufficient to cause deformation of the rearward elongated member 88, the deformation of the rearward elongated member 88 absorbs a portion of the impact energy and limits or restricts overall deformation movement of the body attachment structure 88.

It should be understood from the drawings and the description herein, that the off-center impact structure 12 can be configured in any of a variety of ways. For example, it is possible to eliminate one, or both of the first elongated member 84 and the second elongated member 86 and utilize only the body attachment structure 42 and the rearward elongated member 88 to absorb and transmit impact energy to the frame 22 and the body structure 14 (which is directly fixedly attached to the body attachment structure 42). Alternatively, the off-center impact structure 12 can include only the first elongated member 84, the second elongated member 86 and the body attachment structure 42, eliminating the rearward elongated member 88. Still further, the off-center impact structure 12 can be configured with only the first elongated member 84, the body attachment structure 42 and the rearward elongated member 88 eliminating the second elongated member 86.

SECOND EMBODIMENT

Figure 18:
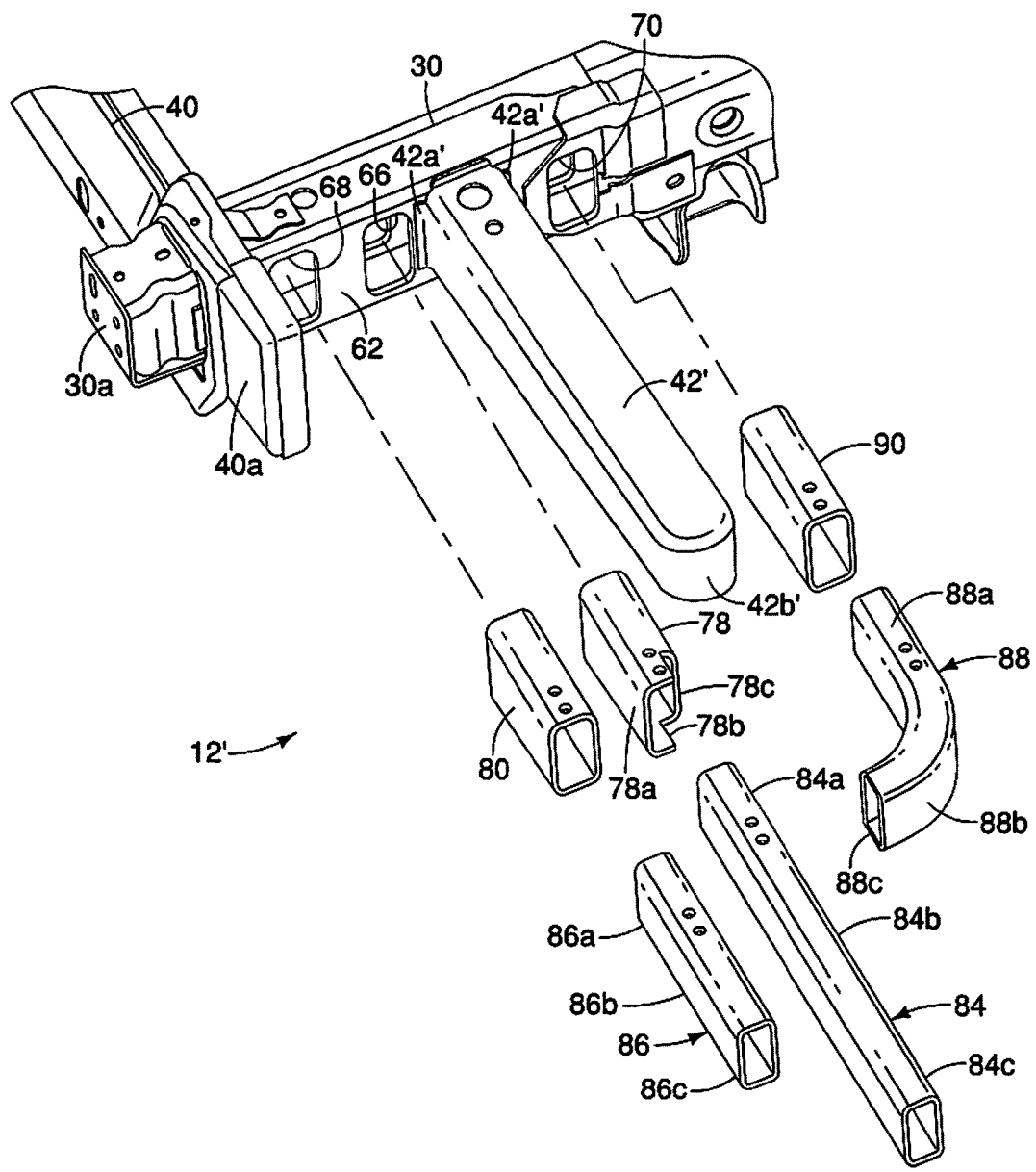
FIG. 18 is an exploded perspective view of a driver's front side of the frame and an off-center impact structure in accordance with a second embodiment.
Figure 19:
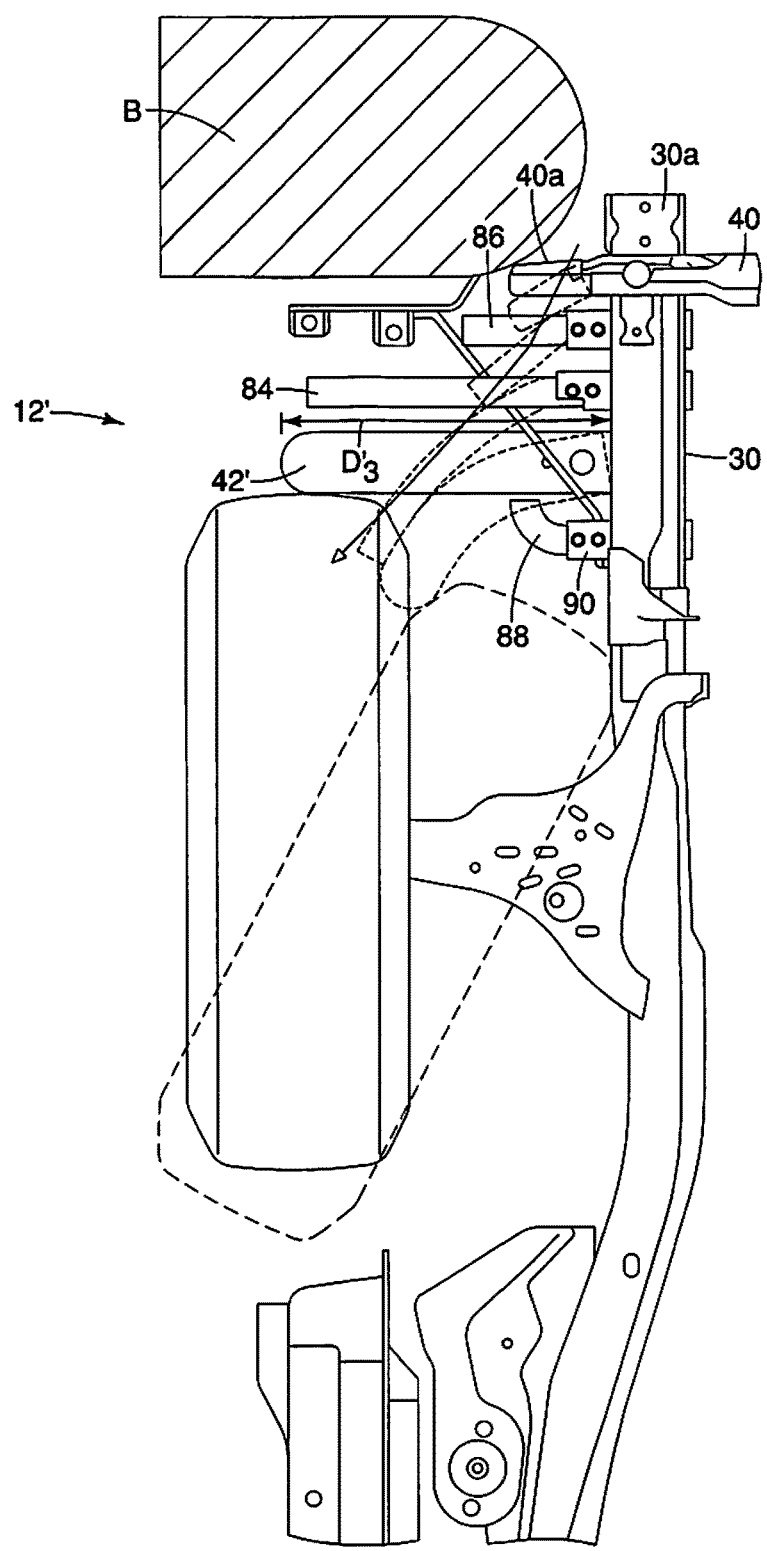
FIG. 19 is a bottom view of the driver's front side of the frame and the off-center impact structure shown with deformation as a result of an impact event in accordance with the second embodiment.

Referring now to FIGS. 18 and 19, an off-center impact structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the off-center impact structure 12' includes many of the features and structures described above with reference to the first embodiment. For example, the off-center impact structure 12' includes various openings in the front side member 30, the first sleeve 78, the second sleeve 80, the first elongated member 84, the second elongated member 86 and the rearward elongated member 88.

However, in the second embodiment, the body attachment structure 42 is replaced with a modified body attachment structure 42'. The body attachment structure 42' includes openings used to connect to and support the body structure 14, but has an overall length measured from the front side member 30 to a distal end of the body attachment structure 42' that is a modified third distance $D_3'$. The third distance $D_3'$ is greater than the first, second and thirds distance $D_1$, $D_2$, and $D_3$ described above with respect to the first embodiment. Consequently, as shown in FIG. 19, the body attachment structure 42' is longer than the first elongated member 84.

As well, the off-center impact structure 12' includes an optional third sleeve 90 that is inserted into the rearward outboard opening 70, the hollow interior 60 and the rearward inboard opening 76 of the front side member 30. The third sleeve 90 can be employed in the first embodiment in combination with the body attachment structure 42, or can be used in the second embodiment with the body attachment structure 42'. In a manner similar to the body attachment structure 42 of the first embodiment, the body attachment structure 42' has flanges 42a' and a wall 42b'. The third sleeve 90 is rigidly fixed to the front side member 30 by, for example. welding to the outboard wall 62 and the outboard wall 64 of the front side member 30. The third sleeve 90 is therefore attached to the front side member 30 in a manner consistent with the attachment of the first and second sleeves 78 and 80 to the front side member 30, as depicted in FIG. 12 and described above with respect to the first embodiment.

The rearward elongated member 88 is inserted into the third sleeve 90 and attached thereto by fasteners (not shown) in a manner consistent with the attachment of the first and second elongated members 84 and 96 to corresponding ones of the first and second sleeves 78 and 80, as depicted in FIGS. 9, 10 and 12 and described above with respect to the first embodiment.

The vehicle body structure 14 and elements of the frame 22 (other than the off-center impact structure 12) are conventional components that are well known in the art. Since these elements and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes mechanical structures that are constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:
1. A vehicle body structure comprising:
a front side member having a front end arid a front-section extending rearward from the front end, the front side member defining a hollow interior and extending in a vehicle longitudinal direction, the front side member having an outboard wall and an inboard wall with an outboard opening extending through the outboard wall to the hollow interior;

a body attachment structure attached to the outboard wall of the front side member along the front-section forward of the outboard opening and extending in an outboard direction from the front side member; and an off-center impact structure having an elongated member with a straight portion that extends through the outboard opening and into the hollow interior of the front side member, the elongated member being fixedly coupled to the outboard wall of the front side member adjacent to, spaced apart from and rearward of the body attachment structure such that in response to an impact event of an off-center impact test the body attachment structure deforms and moves into contact with the elongated member transferring impact force to the elongated member.

2. The vehicle body structure according to claim 1, wherein
the elongated member includes the straight portion and a curved portion that define an overall J-shape as viewed from above, the curved portion being spaced apart from the outboard wall of the front side member.

3. The vehicle body structure according to claim 2, wherein
the curved portion defines an end face perpendicular to the outboard wall of the front side member, the end face facing a rearward surface of the body attachment structure.

4. The vehicle body structure according to claim 2, wherein
the straight portion of the elongated member extends in a direction that is perpendicular to the front side member proximate the outboard opening.

5. The vehicle body structure according to claim 4, wherein
the elongated member extends outboard away from the outboard wall of the flout side member by a first distance, and
the body attachment structure extends outboard away from the outboard wall of the front side member by a second distance that is greater than the first distance.

6. The vehicle body structure according to claim 1, wherein
the inboard wall of the front side member defines an inboard opening aligned with the outboard opening relative to a lateral direction of the front side member with the straight portion of the elongated member being fixedly coupled to the inboard wall proximate the inboard opening.

7. The vehicle body structure according to claim 6, further comprising
a sleeve that extends through the outboard opening, the hollow interior and through the inboard opening of the front side member, the sleeve being fixedly attached to the outboard wall arid the inboard wall with the straight portion of the elongated member extending into the sleeve, the straight portion of the elongated member being directly attached to the sleeve.

8. The vehicle body structure according to claim 7, wherein
the sleeve is welded to the outboard wall and welded to the inboard wall.

9. The vehicle body structure according to claim 8, wherein
the straight portion of the elongated member is directly attached to the sleeve via removable fasteners.

10. The vehicle body structure according to claim 1, wherein
the outboard wall of the front side member defines a first forward outboard opening extending through the outboard wall to the hollow interior, and
the off-center impact structure further includes a first forward elongated member that is linearly shaped defining a first end portion, a mid-section portion and a second end portion, the first end portion extending through the first forward outboard opening into the hollow interior of the front side member and being rigidly connected to the from side member forward of the body attachment structure, the mid-section portion being connected to the front side member at a location proximate the outboard wall, the second end portion extending in an outboard direction away from the outboard wall of the front side member such that in response to the impact event during the off-center impact test the mid-section of the first forward elongated member deforms with the second end portion moves rearward into contact with the body attachment structure.

11. The vehicle body structure according to claim 10, wherein
the outboard wall of the front side member has a second forward outboard opening that extends to the hollow interior of the front side member and is located forward of the first forward outboard opening, and
the off-center impact structure further has a second elongated member that is linearly shaped defining a first end portion, a mid-section portion and a second end portion, the first end portion extending into the second forward outboard opening and into the hollow interior, the mid-section portion being coupled to the front side member proximate the second forward outboard opening and the second end portion extending in the outboard direction from the front side member such that in response to the impact event during the off-center impact test the second forward elongated member deforms with the second end portion of the second forward elongated member moving rearward into contact with the first elongated member structure.

12. The vehicle body structure according to claim 11, wherein
in a non-impacted state the first forward elongated member is parallel to the second forward elongated member.

13. The vehicle body structure according to claim 11, wherein
in a non-impacted state the elongated member extends outboard away from the outboard wall of the front side member by a first distance, and
in the non-impacted state the body attachment structure extends outboard away from the outboard wall of the front side member by a second distance that is greater than the first distance.

14. The vehicle body structure according to claim 13, wherein
in the non-impacted state the first forward elongated member extends laterally outboard from the front side member by a third distance that is less than the second distance and greater than the first distance.

15. The vehicle body structure according to claim 14, wherein
in the non-impacted state the second forward elongated member extends laterally outboard from the front side member by a fourth distance that is less than each of the first, second and third distances.

16. The vehicle body structure according to claim 11, wherein the inboard wall of the front side member defines a first forward inboard opening aligned with the first forward outboard opening relative to a lateral direction of the front side member with the first end portion of the first forward elongated member being fixedly coupled to the inboard wall proximate the first forward inboard opening; and the inboard wall of the front side member defines a second forward inboard opening aligned with the second forward outboard opening relative to the lateral direction of the front side member with the first end portion of the second forward elongated member being fixedly coupled to the inboard wall proximate the second forward inboard opening.

17. The vehicle body structure according to claim 16, further comprising
a first forward sleeve that extends through the first forward outboard opening, the hollow interior and through the first forward inboard opening, the first forward sleeve being fixedly attached to the outboard wall and the inboard wall with the first end portion of the first forward elongated member extending into the first forward sleeve, the first end portion of the first forward elongated member being directly attached to the first forward sleeve.

18. The vehicle body structure according to claim 17, wherein
the first forward sleeve is welded to the outboard wall and welded to the inboard wall, and
the first end portion of the first forward elongated member is directly attached to the first forward sleeve via removable fasteners.

19. The vehicle body structure according to claim 18, further comprising
a second forward sleeve that extends through the second forward outboard opening, the hollow interior and through the second forward inboard opening, the second forward sleeve being fixedly attached to the outboard wall and the inboard wall with the first end portion extending into the second forward sleeve.

20. The vehicle body structure according to claim 19, wherein
the second forward sleeve is welded to the outboard wall and welded to the inboard wall, and
the first end portion of the second forward elongated member is directly attached to the second forward sleeve via removable fasteners.

* * * * *